Dec. 21, 1971  B. C. WENTWORTH  3,629,390
AVIAN SPECIFIC, BIO-AFFECTING PREPARATION AND TREATMENT METHOD
Filed Dec. 18, 1969  2 Sheets-Sheet 1

INVENTOR
BERNARD C. WENTWORTH

BY  Ernest S. Cohen
    Roland A. Shubert
ATTORNEYS

United States Patent Office 3,629,390
Patented Dec. 21, 1971

3,629,390
AVIAN SPECIFIC, BIO-AFFECTING PREPARATION AND TREATMENT METHOD
Bernard C. Wentworth, Amherst, Mass., assignor to the United States of America as represented by the Secretary of the Interior
Filed Dec. 18, 1969, Ser. No. 886,227
Int. Cl. A61k 27/12
U.S. Cl. 424—2
8 Claims

ABSTRACT OF THE DISCLOSURE

An avian specific, bio-affecting composition is prepared by dispersing a physiologically active compound within an abraidable matrix inert to mammalian digestive processes. Controlled release of the active compound occurs as the preparation is abraided in a bird's gizzard.

BACKGROUND OF THE INVENTION

It has long been known to treat domestic fowl with hormonal compounds to reduce or destroy sexual functions and thus increase fattening rate and improve meat quality. The method of treatment may comprise oral ingestion, such as by mixture of a hormone preparation in feed, or by physical implantation of a slowly-dissolving pellet. While these methods are satisfactory to treat confined domestic flocks, they have very serious drawbacks when used to treat wild bird populations.

From a practical point of view it is impossible to catch and individually treat an extensive number of wild birds. Mixing poisons or hormone preparations with feed and baiting wild birds with the mixture has been proposed but introduces unacceptable hazards to domestic and wild animals and even to children.

In urban areas, one of the major pest birds is the pigeon. Not only is this bird undesirable from an esthetic point of view but accumulations of their droppings often contain the infections spores of Histoplasma (cause of human histoplasmosis) and Crytococcus (cause of crytococcosis). Pigeons also play a role in the transmission of other diseases such as psittacosis and encephalitis.

Since pigeons are a gregarious bird often congregating in city parks, control of their numbers introduces special problems. Any control program must first of all be avian specific and safe to pets and humans. Secondly, a control program desirably is relatively species specific sparing song birds and other desirable types. Up to this time no proposed method or preparation could meet these criteria.

SUMMARY OF THE INVENTION

It has now been found that conventional bio-affecting compounds can be made avian specific in a very simple fashion. If such compounds are dispersed in particles of a non-leachable solid matrix material inert to mammalian digestive processes, than oral ingestion of the preparation by humans or other animals is completely harmless. The preparation simply passes through the digestive tract without release of the active compound. When these same preparations are ingested by birds, however, the grinding and abraiding action occurring in the gizzard releases active compound in a controlled fashion for an extended period of time after ingestion.

Hence, it is an object of this invention to provide an avian specific, bio-affecting preparation and treatment method.

A specific object of this invention is to provide a safe, specific and effective preparation and method for the control of wild bird populations.

DETAILED DESCRIPTION OF THE INVENTION

The invention will be more clearly understood and appreciated by reference to the accompanying drawings in which.

Figure 1:
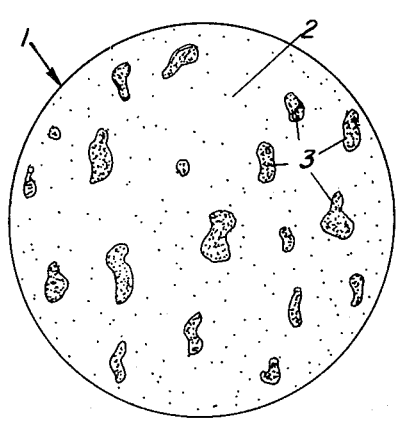
FIG. 1 represents a cross-sectional view of the avian grit particle of this invention.

Turning now to FIG. 1, there is shown a cross-sectional view of an avian grit particle 1 made in accordance with this invention. The particle is shown as being spherical only for convenience; it may be spherical or may be any other geometric or irregular shape. Most simply, the grit particle comprises an erodable matrix material 2 containing in a dispersed fashion a physiologically active compound 3. It is necessary that the matrix material be substantially completely inert to mammalian gastro-intestinal juices and digestive processes. It is highly desirable that the matrix material have sufficient hardness and toughness to resist cracking and cutting when chewed or bitten by humans or other animals.

The matrix material may comprise any formulation having the properties of inertness, relative hardness and toughness coupled with formability. It has been found that plastics or resins which can be worked or formed in a soft or liquid state and then hardened are admirably suited for use as a matrix material. Particularly appropriate are those plastics or resins which can be reacted with a catalyst or other agent to form a tough, hard solid at low temperatures. A specific example of such materials are the epoxy resins. Since many physiologically active compounds contemplated for use in this invention are not stable at highly elevated temperatures, most thermoplastics will find limited use as the matrix material.

Properties of the matrix material may be suitably modified by the addition of filler materials such as silica, metal oxides and the like to give greater hardness and strength. By suitably adjusting the hardness and erodability of the matrix, it is possible to attain long-term controlled release of the physiologically active compound. Release of the active compound may continue for 3 to 6 months, or even longer, after ingestion of the grit material. The grit particles may be produced in any desired color by the addition of suitable and compatable pigments or dyes. There is some experimental evidence available tending to show color preferences exhibited by particular species of birds. E. R. Kalmbach, in a paper published as Transactions, Eighth North American Wildlife Conference, Denver, Colo., pages 408–416 (1943) reported that food dyed a brilliant red was most repulsive to captivity-reared, bob-white quail. Grain which had been dyed orange or purple appeared relatively acceptable to English sparrows and bob-white quail while food dyed brilliant shades of yellow and green appeared repulsive to the sparrows. Of the colors tested, blue was found to be the most repulsive to chickens. In some cases, grit having a color preferred by a particular species increases the acceptance of the grit by that species resulting in higher selectivity of a free choice baiting program. Similar techniques are known in the art as is shown by H. R. Shuyler (U.S. Pat. No. 2,957,804, Oct. 25, 1960) who states:

In order for the instant pesticide product to be advantageously effective in the control of bird pests, it is desirable that the color on the outermost layer be of such nature as to be not unattractive to birds. Yellow and various shades of this color and combinations therewith have proven not to be unattractive to birds and would be the preferred color of the pellets when intended for use in the control and reduction of bird pests (column 12, lines 48–56).

The physiologically active compound may be incorporated within the matrix in a variety of ways. First, if the compound used is in a solid form, it may simply be physically admixed with the resin material. Active compounds which are normally solid preferably are first dispersed in a material such as gelatin or albumin, then dried, crushed and thereafter dispersed in the resin. If the active ingredient is liquid, it is preferred to absorb the liquid on an inert solid and thereafter disperse particles of the solid in the resin formulation. Any solid having absorptive capacity and inert to the active compound and to the resin formulation is satisfactory for use in this manner. Particularly preferred are such absorbents as granulated wood particles (sawdust and the like) and charcoal. Other porous solids such as alumina and silica gel may also be used.

Figure 2:
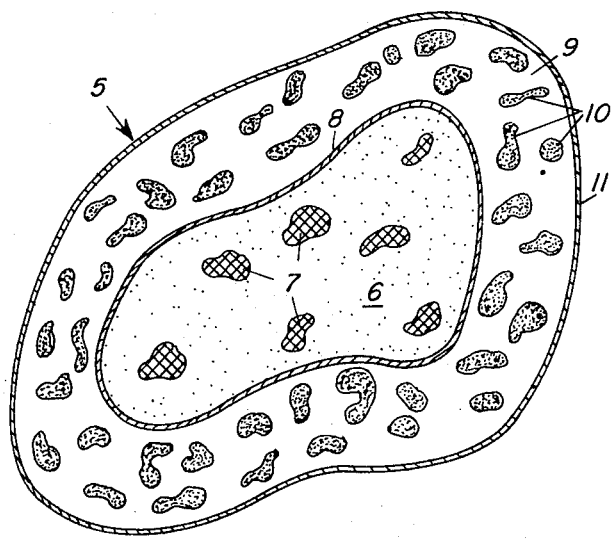
FIG. 2 is a cross-sectional view of a dual-layer grit particle.

Turning now to FIG. 2, there is shown another embodiment of the avian-specific grit particle. The grit particle is generally depicted by the numeral 5 and comprises a central core of matrix material 6 having dispersed therein particles containing an active compound 7. Surrounding the central core may be a coating 8 which can conveniently comprise simply matrix material devoid of particles of the active compound. A second layer of matrix material 9 having dispersed therein particles containing an active compound 10 surrounds the central core. Active compound 10 may be either the same or different from active compound 7. In some cases, it is advantageous for the active compound in both the central core and in the second layer to be identical but differing in concentration. This arrangement is especially useful when it is desired to administer a high level or "shock" dosage of the active compound followed by a long term, low-level administration of that same compound.

External coating 11 again may simply comprise matrix material devoid of particles of the active compound. It may be applied in any conventional manner after fabrication of the grit particle or may be formed simultaneously with formation of the grit particle. In the latter case, grit particles may be individually molded which results in an essentially unbroken surface composed of the resinous core material. Size of the grit particles is preferably adjusted to the species of bird being treated. For example, grit particles on the order of 7 to 10 mesh are appropriate for treating small birds such as quail.

Treatment is preferably carried out by free choice methods. Grit is set out in areas accessible to and frequented by birds. When the grit is used for population control of pest birds such as pigeons in urban areas, free choice baiting may be done in parks and other public places. In situations such as this, absolute selectivity toward birds and safety to pets, squirrels and children is assured since the grit particles will pass through the mammalian digestive track without release of the active compound. Color of the grit preparation may also contribute to its safety in use. See for example the Shuyler patent, previously cited, which states that rodents tend to be attracted to the color blue.

In a preferred embodiment, the method of this invention is directed toward pest bird population control especially by hormonal sterilization. Active compounds useful for this purpose are well known in the art and comprise generally the natural hormones and those compounds having hormonal activity. One specific example of such a compound is mestranol (2-methoxy-17α-ethynylestra-1,3,5,(10)-trien 17β-ol). An extensive listing of other suitable compounds may be found in U.S. 2,824,546. Examples of different types of hormonal sterilants useful in the invention are set out in the R. L. Dorfman patent, No. U.S. 3,476,859, Nov. 4, 1969; in French Pat. No. 1,426,945, Dec. 27, 1965; and the Bickoff et al. Pat. No. U.S. 2,890,116, June 9, 1959.

This invention will also find use in the treatment of domestic fowl for the purpose of increasing growth and fattering rate, to modify or increase egg production, cause sex modification of the fowl embryo and other similar uses. Also, contemplated and falling within the scope of this invention is the therapeutic treatment of birds by incorporating an antibiotic, for example, as the active compound and also oral vaccination of birds. When treating domestic fowl, the free choice system may be used as may the gagage method.

The following examples serve to further illustrate and describe the invention.

EXAMPLE 1

A physiologically active avian grit material was prepared using mestranol (3-methyoxy-17α-ethynylestra-1,3,5,(10)-trien 17β-ol) as the active compound. First, lyophobic mastranol particles were formed by mixing 1 part mestranol and 1 part gelatin with sufficient water to obtain a gelatinous mass. This suspension of mestranol in gelatin was then air dried and crushed into small particles. One part of the mastranol-containing particles was then added to a homogeneous mixture of 1 part paraformaldehyde and 5 parts liquid resorcinol-type resin. After uniformly dispersing the mestranol-containing particles in the resin formulation, the mix was poured on a flat surface in the form of a sheet. The resin formulation was then allowed to harden at room temperature after which it was crushed and sized by screening. Concentration of mestranol in the finished grit material was approximately 96 μg. per mg.

EXAMPLE 2

Sixty adult Japanese quail were forced fed an average of 114 mg. of 7-mesh grit which had been prepared by the method of Example 1. This amount of grit corresponded to ⅓ of the 342 mg. average of natural grit found in the gizzards of quail reared in field pens. Selected specimens were killed weekly in order to determine the degree of grit retention and the rate of grit erosion. Erosion rate was found to be essentially a constant. An average of about 708 μg. of grit material was eroded by each bird per day giving a mestranol release rate of 69 μg. per day.

EXAMPLE 3

Adult male quail were forced fed an average of 114 mg. of grit particles prepared in the manner described in Example 1. Eleven of these male quail were mated to untreated females. An additional 11 pairs of untreated quail were used as a control group. Fertility of the treated males and the hatchability of the eggs they fertilized were compared with the control group for a number of 10-day periods. Fertility is defined as the number of fertile eggs divided by total egg production multiplied by 100. Likewise hatchability is defined as the number of eggs hatching divided by the number of fertilized eggs multiplied by 100.

Figure 3:
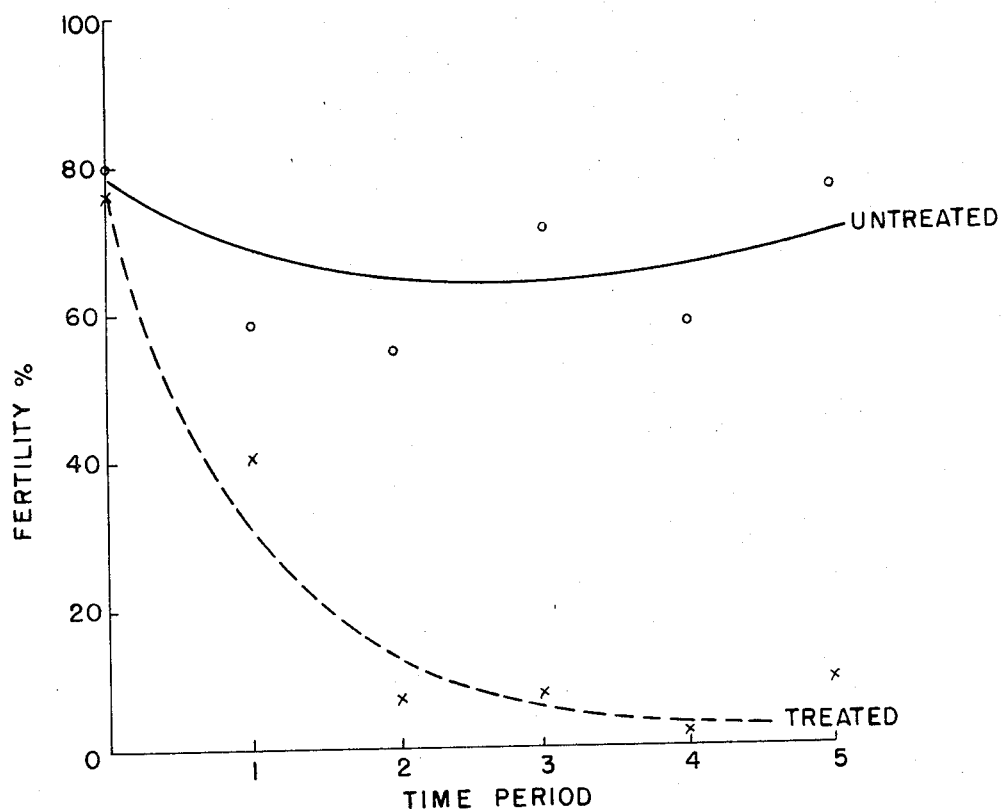
FIG. 3 is a graphical presentation showing the effect of a hormone-containing preparation on the fertility of male quail.
Figure 4:
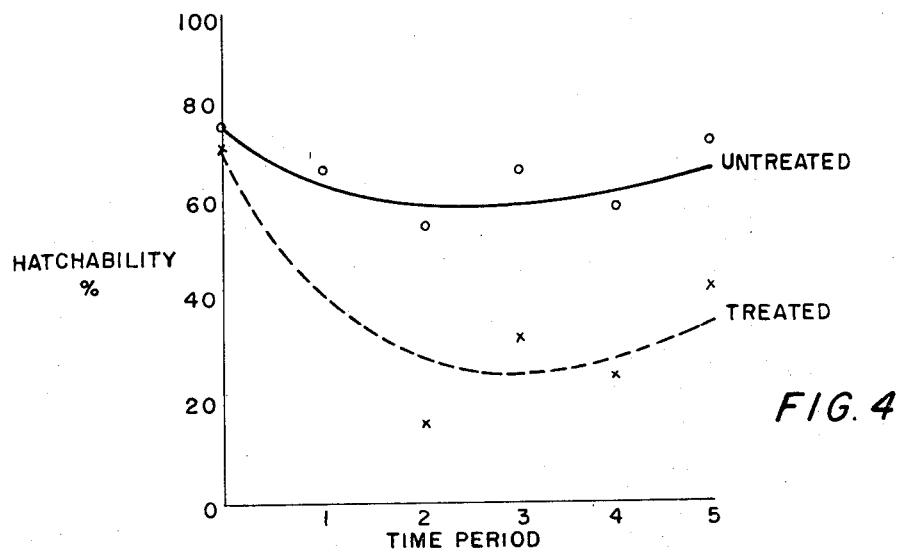
FIG. 4 is a graphical presentation showing the effect of the same preparation on hatchability of eggs fertilized by treated male quail.

Results of the test for the 10-day period prior to treatment and for 5 additional 10-day periods after treatment were presented graphically as FIGS. 3 and 4. As may be seen from FIG. 3, there was an immediate, substantial and sustained decrease in male fertility as a result of the treatment. Hatchability of those eggs fertilized also dropped sharply for the treated group as is shown by FIG. 4. Total fecundity of the treated males is then measured by the additive effects of both decreased fertility and decreased hatchability.

Autopsies of the treated males showed a mean testes weight of about 1.18 g. and a cloacal gland weight of about 0.34 g. compared to a mean of 2.84 g. and 0.60 g. for the testes and cloacal gland weight respectively of untreated males. Both organs were distinctly hypoplastic in the treated males.

EXAMPLE 4

Adult female quail were forced fed an average of 114 mg. of grit particles in the manner described in Example 1. As in the previous example, a group of treated females was mated with normal males while a second group of quail pairs was utilized as a control. Egg production of the treated females and the fertility of the eggs they produced were compared with the control group. Egg production is reported as percent; one egg per day per female equalling 100%. Fertility is defined as in the previous example.

Figure 5:
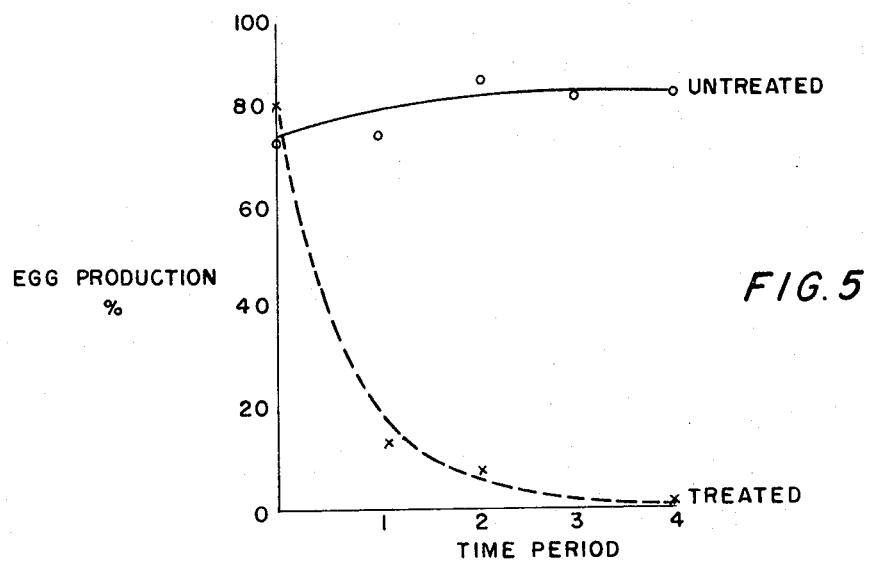
FIG. 5 is a graphical presentation showing the effect of that same preparation on egg production of female quail.
Figure 6:
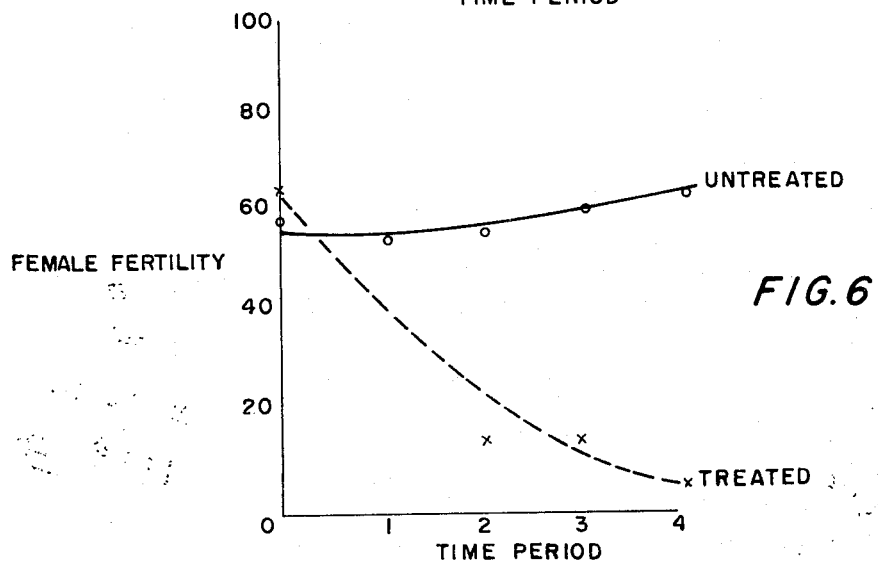
FIG. 6 is a graphical presentation showing the effect of that same preparation on the fertility of female quail.

Results of the test for the 10-day period prior to treatment and for 4 additional 10-day periods post treatment are presented graphically as FIGS. 5 and 6. As illustrated in FIG. 5, egg production dropped immediately to extremely low levels and fertility of those eggs produced also sharply declined as is shown in FIG. 6. Again, fecundity of the treated females is measured by the combined effects of decreased egg production and decreased fertility of those eggs which were produced.

EXAMPLE 5

In another test, parakeets were used as the experimental subjects. Three groups of parakeets, each group having 7 pairs of mature birds, were employed. The males of the first group were treated with an average of 72 mg. of grit particles containing 6.9 mg. of mestranol. Females of the second group were treated in a like manner while the third group was used as a control.

Treated females of the second group laid significantly fewer eggs (11) than did the control group (31). Hatchability was also significantly less for the treated group; 4 eggs hatching from the treated group compared to 22 eggs hatching from the control group.

Nesting behavior of the first group (treated males) was grossly affected and the pair bond appeared to be weakened. Only one female of the first group laid eggs (4), all of which were infertile. It was also observed that treated males passed grit to their mates in 6 out of the 7 pairs. Upon autopsy of the first group 65 days after treatment, it was found that the 7 males retained an average of 10 mg. of grit while 6 of the 7 females retained an average of 8.4 mg. In comparison, treated females of the second group retained an average of 51 mg. at autopsy.

EXAMPLE 6

A synthetic grit was prepared in the general manner set out in Example 1, except that the active ingredient was a fat-seeking dye (Sudan Black B) rather than mestranol. It was observed that the yolks of eggs laid by treated birds were colored by the dye for a period of 6 months after treatment. This example illustrates the long term, chronic treatment attainable by a single administration of the erodable grit material.

EXAMPLE 7

A synthetic grit was prepared in the general manner set out in Example 1, except that the active ingredient was the antibiotic Terramycin. The grit was administered to sick pheasants and a definite therapeutic effect was observed.

EXAMPLE 8

Another synthetic grit was prepared by absorbing liquid hexamethylphosphoramide on wood particles and on bone charcoal. The hexamethylphosphoramide-containing particles were then mixed in a resin and formed into a grit in the manner set out in Example 1.

EXAMPLE 9

Another synthetic grit was prepared containing mestranol as the active compound. In this case, the mestranol was dispersed in egg albumin and the mixture was allowed to dry in a sheet. The dried sheet was pulverized and then dispersed in a resin formulation. Synthetic grit particles were prepared by allowing the formulation to cure in small molds. Few, if any, mestronal containing particles were exposed at the surface of the individual grit particles and no discernible release of active compound occurred upon leaching.

Of course, many minor changes and variations will be apparent to those skilled in the art including color, size, choice of active compound and the like according to the principles taught in this pecification.

What is claimed is:

1. An avian-specific, bio-affecting, grit preparation comprising an erodable matrix having dispersed throughout it a sterilizing hormone, said matrix comprising a tough, relatively hard, solid synthetic resin molded in a liquid state at temperatures which will not adversely affect the stability of the sterilizing hormone, said grit preparation having a color not unattractive to if not in fact preferred by gregarious wild and domestic birds.

2. The grit preparation of claim 1 wherein the surface of the grit particles comprises matrix material devoid of sterilizing hormone.

3. The grit preparation of claim 2 wherein the sterilizing hormone is mestranol.

4. The grit preparation of claim 2 wherein the grit particles have a central core containing a relatively dilute concentration of sterilizing hormone and a second layer surrounding the central core and containing a relatively high concentration of sterilizing hormone.

5. The grit preparation of claim 4 wherein the sterilizing hormone contained in the central core is the same as the sterilizing hormone contained in the second layer.

6. An avian-specific, bio-affecting treating method for gregarious wild and domestic bird populations which comprises administering a grit preparation on a free choice basis to said bird populations at a locale accessible to and frequented by said birds; the grit preparation comprising an erodable matrix having dispersed throughout it a sterilizing hormone, said matrix comprising a tough, relatively hard, solid synthetic resin molded in a liquid state at temperatures which will not adversely affect the stability of the sterilizing hormone, said grit preparation having a color not unattractive to if not in fact preferred by said birds.

7. The method of claim 6 wherein the bird population comprises pigeons and wherein the treating locale is accessible to domestic and wild animals including squirrels, pets and children.

8. The method of claim 7 wherein the sterilizing hormone is mestranol.

References Cited
UNITED STATES PATENTS

| | | | |
|---|---|---|---|
| 2,052,376 | 8/1936 | Zellers | 424—34 |
| 2,152,438 | 3/1939 | McHan | 99—4 |
| 2,331,807 | 10/1943 | Shear | 99—4 |
| 2,463,704 | 3/1949 | Lloyd et al. | 99—4 |
| 2,485,669 | 10/1949 | Sondern | 99—4 |
| 2,806,773 | 9/1957 | Pole | 99—4 X |
| 2,890,116 | 6/1959 | Bickoff | 99—2 |
| 2,957,804 | 10/1960 | Shuyler | 424—17 X |
| 3,076,744 | 2/1963 | Geary | 424—82 |
| 3,162,573 | 12/1964 | Geary | 424—82 |

(Other references on following page)

UNITED STATES PATENTS

| | | | |
|---|---|---|---|
| 3,223,513 | 12/1965 | Geary | 424—82 X |
| 3,352,684 | 11/1967 | Gard et al. | 99—4 |
| 3,476,859 | 11/1969 | Dorfman | 424—317 |

FOREIGN PATENTS

| | | |
|---|---|---|
| 34,359 | 2/1965 | Australia. |
| 6409615 | 2/1965 | Netherlands. |
| 1,426,945 | 12/1965 | France. |
| 856,218 | 11/1970 | Canada. |

OTHER REFERENCES

Kalmbach, E. R.: "Birds, Rodents and Colored Lethal Baits," pp. 408–416, trans. 8th N. Amer. Wildlife Conf., Denver, Colo., Feb. 15–17, 1943.

SHEP K. ROSE, Primary Examiner

U.S. Cl. X.R.

43—124, 131; 99—24; 119—1, 156; 128—1, 172, 223, 272; 424—7, 17, 19, 21, 22, 32, 78, 82, 84, 243